T. A. EDISON.
PHONOGRAPHIC RECORDING APPARATUS.
APPLICATION FILED JAN. 27, 1910.

1,152,614.

Patented Sept. 7, 1915.

Witnesses:
Frank D. Lewis
Dyer Smith

Inventor:
Thomas A. Edison
by Frank L. Dyer
his Atty.

T. A. EDISON.
PHONOGRAPHIC RECORDING APPARATUS.
APPLICATION FILED JAN. 27, 1910.
1,152,614.
Patented Sept. 7, 1915.
2 SHEETS—SHEET 2.
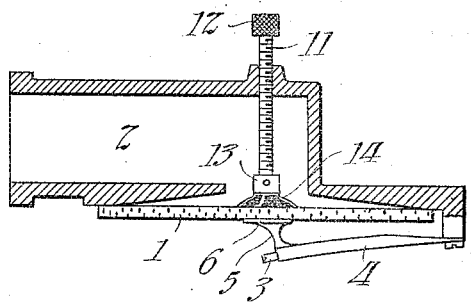
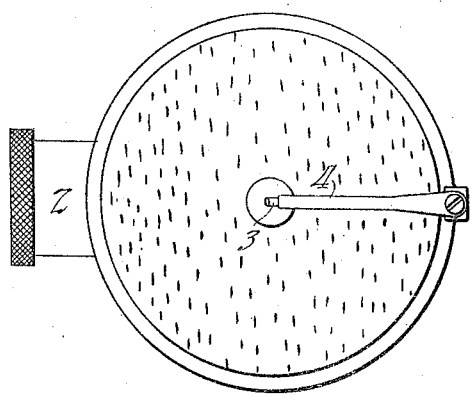

UNITED STATES PATENT OFFICE.

THOMAS A. EDISON, OF LLEWELLYN PARK, WEST ORANGE, NEW JERSEY, ASSIGNOR TO NEW JERSEY PATENT COMPANY, OF WEST ORANGE, NEW JERSEY, A CORPORATION OF NEW JERSEY.

PHONOGRAPHIC RECORDING APPARATUS.

1,152,614.      Specification of Letters Patent.     Patented Sept. 7, 1915.

Application filed January 27, 1910. Serial No. 540,317.

*To all whom it may concern:*

Be it known that I, THOMAS A. EDISON, a citizen of the United States, and a resident of Llewellyn Park, West Orange, county of Essex, and State of New Jersey, have made a certain new and useful Invention in Phonographic Recording Apparatus, of which the following is a description.

My invention relates to phonographic recording apparatus, and my object is to provide a recording apparatus which is extremely sensitive to vibrations of small amplitude, but which is relatively insensitive to vibrations of large amplitude. Heretofore, recording devices which have been sufficiently sensitive to record vibrations of small amplitude, have permitted the diaphragm to move excessively when recording vibrations of relatively great amplitude. On the other hand, diaphragms which are sufficiently stiff and sensitive to permit practicable recording of vibrations of great amplitude have been practically unresponsive to the very small vibrations which often give character and quality to music.

As it is necessary to keep the maximum movement of the diaphragm within certain limits, my invention provides an extremely sensitive diaphragm, preferably of cork, which shall be readily responsive even to excessively weak vibrations, and I employ in coöperation therewith a braking or retarding device having the peculiarity of imposing resistance to the diaphragm only when it tends to vibrate to an undue extent, so as to thereby dampen and control its movements under the effect of sound vibrations of great amplitude. The advantages of a cork diaphragm are pointed out in my application Serial No. 526,036, filed Nov. 3, 1909. The braking or retarding means referred to are positioned preferably on the side of the diaphragm distant from the stylus. I will describe herein two suggested arrangements, either of which is adapted to perform the function described.

In order that the invention may be better understood, attention is hereby directed to the accompanying drawings, forming part of this specification, and in which I illustrate two forms of apparatus embodying my invention.

Figure 1:
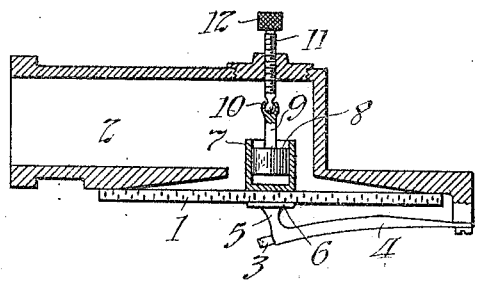
Figure 2:
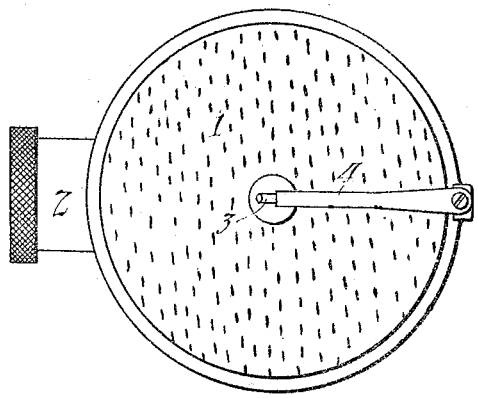

Figure 1 represents a vertical cross sectional view of one form of apparatus embodying my invention. Fig. 2 represents a bottom plan view thereof. Fig. 3 represents a vertical cross sectional view of a second form of apparatus embodying my invention, and Fig. 4 represents a bottom plan view thereof.

Referring to the drawings, the diaphragm 1 of cork or other desired material is secured in any desired manner to the sound box 2. The recording stylus 3 is carried by the arm 4 which may be secured to the flange of sound box 2, as shown in the drawings, or otherwise suitably mounted, the foot 5 integral with or secured to arm 4 being cemented or otherwise secured to the center of the under side of the diaphragm as indicated at 6.

Referring to the form of my apparatus shown in Figs. 1 and 2, a small cylinder 7 is secured axially to the upper side of the diaphragm 1 and the plunger 8 is positioned within the cylinder. This plunger is secured to the sound box 2 in any desired manner, so that the air confined within the cylinder below the plunger is compressed by upward movement of the diaphragm to prevent excessive movement of the latter. As shown in the drawings, the plunger is provided with an upper portion 9 of reduced diameter, which is connected by a ball and socket joint 10 with an adjusting screw 11, which is threaded within the wall of sound box 2, as shown. By making use of a ball and socket joint as described, the danger of the plunger cramping within the cylinder 7 is overcome, and a smooth relative movement of the two elements is permitted at all times. The portion of the wall of sound box 2 in which screw 11 is threaded, may itself be removably secured, as by a screw engagement within a threaded opening in the wall of the sound box, as shown in the drawings, for convenience in adjusting the parts. The position of plunger 8 within cylinder 7 may be adjusted by rotating screw 11 in either direction by means of knurled head 12, whereby the amount of compression obtained between the bottom of plunger 8 and the upper side of diaphragm 1 on the upward movement of the diaphragm may be varied. It will, of course, be obvious that, if desired, the positions of cylinder 7 and plunger 8 might be reversed, the plunger being secured to the diaphragm, and the cylinder to the sound box.

Referring to the form of my invention shown in Figs. 3 and 4, the screw 11 is threaded within the wall of sound box 2 in the same manner as in the first species of my invention, but the lower end of this screw is provided with a head 13 having a flat lower surface which is adjusted to a position only a short distance above the upper side of diaphragm 1. A sticky viscous material 14 is placed upon the center of the upper side of diaphragm 1 before screw 11 is adjusted, so that it forms a yielding connection between the diaphragm and the lower surface of head 13. This sticky material is too viscous to flow to any extent, and acts practically in the same manner as the air cushion described in connection with Figs. 1 and 2. In either case the compression of the air or the distortion of the viscous material imposes substantially no resistance to movements of the diaphragm caused by very weak vibrations, whereas, in the case of sound vibrations of great magnitude, the movements of the diaphragm are dampened and kept within practicable limits.

Both forms of cushioning means herein disclosed are substantially incapable of being set into continued vibration by the elasticity thereof and therefore offer no objectionable interference to the true vibration of the diaphragm.

It is to be understood that I am not limited to the exact details of construction shown in the drawings, but that my invention is as broad as the appended claims.

Having now described my invention, what I claim and desire to protect by Letters Patent is as follows:

1. In a device of the class described, the combination of a sound box, a diaphragm mounted therein, a stylus in operative relation to said diaphragm, and means bearing on said diaphragm and comprising an air chamber for imposing a resistance to the vibrations of the diaphragm, substantially as described.

2. In a device of the class described, the combination of a sound box, a diaphragm mounted therein, a stylus in operative relation to said diaphragm, and means for imposing resistance to the vibrations of the diaphragm, comprising an air chamber and a plunger fitting therein, one of said parts bearing on said diaphragm, said air chamber and plunger being manually adjustable relatively to each other for varying the resistance to the movement of the diaphragm, substantially as described.

3. In phonographic sound recording apparatus, in combination, a sound box, a diaphragm secured thereto, a stylus connected therewith, and a device for imposing a resistance to the vibrations of the diaphragm of considerable amplitude, comprising a cylinder and a plunger closely fitting therein, said parts being relatively movable, and one of said parts bearing on and moving with said diaphragm, substantially as described.

4. In phonographic sound recording apparatus, in combination, a sound box, a diaphragm secured thereto, a stylus connected therewith, a cylinder and a plunger closely fitting therein, one of said parts being secured to said diaphragm and the other of said parts being secured to said sound box, and supporting means for one of said parts constructed to prevent binding between said cylinder and plunger in their relative movement, substantially as described.

5. In phonographic sound recording apparatus, in combination, a sound box, a diaphragm secured thereto, a stylus connected therewith, a cylinder secured axially to said diaphragm, a plunger fitting closely therein, an adjustable member secured in said sound box axially in line with said plunger, and a ball and socket connection between said member and said plunger, substantially as described.

6. In phonographic sound recording apparatus, in combination, a sound box, a diaphragm secured thereto, a stylus connected with said diaphragm, means for imposing a resistance to the vibration of the diaphragm comprising a cylinder and a plunger closely fitting therein, and means for manually adjusting the normal positions of said cylinder and plunger axially of each other, substantially as described.

This specification signed and witnessed this 26th day of January 1910.

THOS. A. EDISON.

Witnesses:
 DYER SMITH,
 JOHN M. CANFIELD.

Copies of this patent may be obtained for five cents each, by addressing the "Commissioner of Patents, Washington, D. C."